United States Patent
Gupta et al.

(10) Patent No.: US 11,966,321 B2
(45) Date of Patent: Apr. 23, 2024

(54) REPORTING SYSTEMS AND METHODS

(71) Applicants: ATLASSIAN PTY LTD, Sydney (AU); Atlassian US, Inc., San Francisco, CA (US)

(72) Inventors: Vipul Gupta, Bangalore (IN); Nipun Aggarwal, Panchkula (IN)

(73) Assignees: ATLASSIAN US, INC., San Francisco, CA (US); ATLASSIAN PTY LTD, Sydney (AU)

( * ) Notice: Subject to any disclaimer, the term of this patent is extended or adjusted under 35 U.S.C. 154(b) by 0 days.

(21) Appl. No.: 17/650,998

(22) Filed: Feb. 14, 2022

(65) Prior Publication Data

US 2023/0259445 A1   Aug. 17, 2023

(51) Int. Cl.
G06F 11/07    (2006.01)
G06F 11/36    (2006.01)

(52) U.S. Cl.
CPC ...... G06F 11/3616 (2013.01); G06F 11/0781 (2013.01)

(58) Field of Classification Search
CPC .......... G06F 11/3616; G06F 11/0781
See application file for complete search history.

(56) References Cited

U.S. PATENT DOCUMENTS 11,044,348 B1   6/2021  Cannon-Brookes et al.
11,516,222 B1 * 11/2022 Srinivasan .......... H04L 41/0654
2006/0277206 A1 * 12/2006 Bailey ................. G06F 11/3409
                                                    707/999.102
2018/0240052 A1 *  8/2018 Goyal ................ G06Q 10/0637
2022/0141318 A1    5/2022 Cannon-Brookes et al.

FOREIGN PATENT DOCUMENTS

EP      3995953 A1    5/2022

OTHER PUBLICATIONS

Systems and Methods for Integrating Computer Applications, U.S. Appl. No. 17/654,352.
Systems and Methods for Integrating Computer Applications, U.S. Appl. No. 17/654,357.

* cited by examiner

*Primary Examiner* — Matthew M Kim
*Assistant Examiner* — Kyle Emanuele
(74) *Attorney, Agent, or Firm* — ALSTON & BIRD LLP

(57) ABSTRACT

Systems and methods for determining the priority of a set of reports available to a user. The method comprising determining, by a reporting application, a set of reports available to a user, each report including one or more metrics. The method further comprising obtaining metric data associated with each of the set of reports available to the user, accessing one or more priority calculation parameters for each report in the set of reports, calculating a priority value of each report of the set of reports based on the metric data and the priority calculation parameters for each report, and determining one or more high priority reports based on the priority value of each report of the set of reports.

19 Claims, 7 Drawing Sheets

REPORTING SYSTEMS AND METHODS

TECHNICAL FIELD

Aspects of the present disclosure are directed to data processing and more particularly to reporting systems and methods.

BACKGROUND

Various methods, apparatuses, and systems are configured to provide techniques for processing data and generating reports. Applicant has identified many deficiencies and problems associated with existing methods, apparatuses, and systems for processing data and generating reports. Through applied effort, ingenuity, and innovation, these identified deficiencies and problems have been solved by developing solutions that are in accordance with the embodiments of the present invention, many examples of which are described in detail herein.

SUMMARY

Example embodiments described herein are directed to a computer implemented method. The method includes determining, by a reporting application, a set of reports available to a user, where each report includes one or more metrics. The method further includes obtaining, by the reporting application, metric data associated with each of the set of reports available to the user and accessing one or more priority calculation parameters for each report in the set of reports. The method further includes calculating, by the reporting application, a priority value of each report of the set of reports based on the metric data and the priority calculation parameters for each report, and determining, by the reporting application, one or more high priority reports based on the priority value of each report of the set of reports.

Some example embodiments are directed to a computer processing system including a processing unit, and a non-transitory computer readable medium storing instructions, which when executed by the processing unit, cause the processing unit to perform the method described above.

Some other example embodiments are directed to a non-transitory computer readable medium storing instructions executable by a processing unit to cause the processing unit to perform the method described above.

Figure 1:
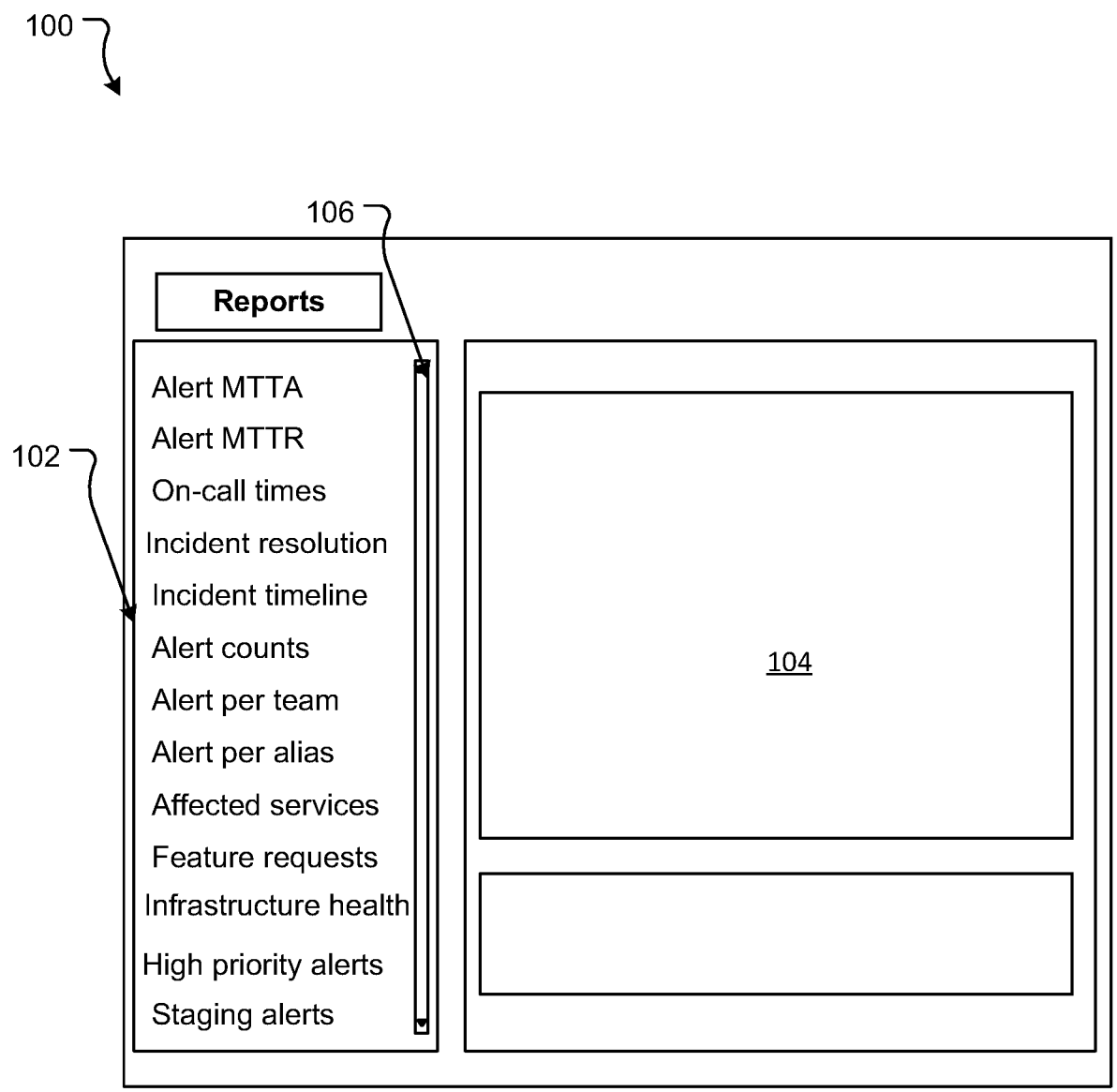
FIG. 1 illustrates an example reporting interface.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Overview

Many organizations make use of reporting systems which generate reports that can be used by stakeholders to oversee the state of affairs of the organization. Such reporting systems access data relevant to the organization and, based on that data, generate reports in respect of various metrics that are important to the organization. As referred to herein a metric may be a standard of measurement. A value of a metric may capture meaningful quantitative dimension(s) or information from underlying raw data.

The particular metrics that a reporting system generates reports in respect of vary depending on the nature of the organization in question. As one example, the reporting system may be or work in conjunction with an issue tracking system. In this case, data relevant to the operations of the organization may be associated with "issues" (or, more generally, work items) that are maintained by the issue tracking system.

Specific examples of such issue tracking systems include the Jira family of products commercially available from Atlassian—for example Jira Software, Jira Service Management, Jira Work Management, and Jira Align. Generally speaking, and by way of example, an issue tracking system such as Jira allows users to create and manage "issues". A given issue is associated with a set of data fields and a lifecycle—i.e. a series of states through which the issue transitions over its lifecycle.

The particular data fields and lifecycle associated with an issue of a given type may vary greatly depending on the scenario in which the issue tracking system is implemented. By way of example, an issue tracking system may be implemented in a helpdesk scenario (where issues may be created to track support requests that are raised with the helpdesk), a project management scenario (where issues may be created to track work items that need to be completed as part of a given project), a software development scenario (where issues may be created to track features that are to be implemented and/or bugs that are to be fixed), and or any other scenario.

Based on an organization's data (whether stored by an issue tracking system as described or by an alternative system), a reporting system may be configured to generate various reports which provide information regarding metrics that are relevant to the system. Examples of such metrics (in a helpdesk scenario) may include the number tickets opened in a given time period, the mean time to acknowledge a new ticket (in a given time period), the mean time to resolve a ticket (in a given time period), the number of tickets assigned to a given team (in a given time period), the number of tickets assigned to a particular operator (in a given time period), the number of tickets at a particular priority level, and/or a variety of other metrics that may be relevant to running a service desk.

It will be appreciated that in the context of this disclosure a report is associated with one or more metrics and the metrics themselves are based on underlying data. For example, a 'tickets resolved in last day' report may be associated with a 'number of tickets resolved' metric. And this metric value may be computed based on the number of tickets that have been marked as 'resolved' in a given time period. Further a metric value may be for a given point in time (e.g. the number of currently open tickets) or a defined time range (e.g. the number of tickets that were opened over the last week). The time/time period may be preconfigured—e.g., every minute, every hour, every 6 six hours, etc. In one example, the reporting system may maintain a data store of historical and current values for the metrics maintained by the system. These metric values may be used to determine whether the metric value at any given time has deviated from an "expected" or average value. Table A below shows an example of the metric data that may be stored by the reporting system.

TABLE A example metric data

| Metric ID | Window | Current metric value | Previous metric value |
|---|---|---|---|
| No. Tickets Resolved | 10 days | 100 | 98 |
| Alert_count | 5 days | 120 | 250 |
| No. Tickets Resolved | 15 days | 25 | 35 |
| . . . | . . . | . . . | . . . |

As shown in this table, each record stores a unique metric identifier, a preconfigured granularity window (for computing rolling averages), a current rolling metric value (e.g., the average metric value in the preconfigured window) and the previous metric value (e.g., the average metric value in the previous rolling window). Each time a new metric is created, it may be added to this data store and the current and previous metric values may be computed. The window may be a default value or a configured value (if provided by the metric author).

In some embodiments, metric data (or data utilized to derive metric data) is automatically generated and/or stored in response to operation of one of more computing system(s), application(s), and/or the like. For example, in some embodiments metric data or data utilized to derive metric data utilizing one or more particular determinable or pre-defined algorithm(s) is generated and stored in response to user interaction with one or more product application(s). It will be appreciated that, in many contexts, such data may include distributed data associated with interaction(s) performed by multiple different client device(s), user(s), and/or the like. Accordingly, in some embodiments such data includes big data environments that are impossible or impractical for monitoring by human actors alone, and/or impractical to process utilizing conventional data processing and display mechanisms.

In addition to storing metric data, the reporting system may also store report data in some examples. Generally speaking, instances of a given report may be generated periodically and/or on demand. Each instance of a given report provides the value(s) of the report's metric(s) for a given point in time or a time range in a suitable format (e.g., text, chart, graph, tables, video, etc.).

In an exemplary scenario, a "tickets resolved in last day" report may be configured to run on a daily basis (or for example, hourly, weekly, fortnightly, monthly, every second Tuesday, etc.). When a given instance of the "tickets resolved in last day" report is generated, the reporting system calculates the value of the "no. tickets resolved" metric present in the report based on the relevant underlying data. In this particular example, the reporting system may interrogate the available data to identify/calculate the number of tickets that transitioned to the "resolved" state in the 24 hours preceding the current instance of the report being generated. A first instance of the "tickets resolved in last day" report run on 2 Jan. 2022 may have a value of (for example) 100 for the "no. tickets resolved" metric (indicating that on 1 January 100 tickets transitioned to the "resolved state"). A second instance of the "tickets resolved in last day" report run on 3 Jan. 2022 may have a value of 105 for the "no. tickets resolved" metric (indicating that on 2 January 105 tickets transitioned to the "resolved state"). A third instance of the "tickets resolved in last day" report run on 4 January 2022 may have a value of 150 for the "no. tickets resolved" metric. Over time, therefore, the report can be associated with a series of values and these values can be stored in a database. Table B below shows an example of the metric values associated with a report for different report generation dates/times.

TABLE B example report data

| Report ID | Metric ID | Report date | Metric value |
|---|---|---|---|
| tickets resolved in last day | No. Tickets Resolved | 2 Jan | 100 |
| tickets resolved in last day | No. Tickets Resolved | 3 Jan | 100 |
| tickets resolved in last day | No. Tickets Resolved | 4 Jan | 105 |
| tickets resolved in last day | No Tickets Resolved | . . . | . . . |

Further, where the reporting system is part of (or runs in conjunction with) an issue tracking system (such as Jira or an alternative issue tracking system), a report may be a dashboard provided by that system.

In some examples, the reporting system may be preconfigured with certain default reports (which report on default metrics) and/or may allow users to create their own reports (and determine the particular metrics that a given report provides information on and/or how those metrics are calculated based on the available underlying data).

Oftentimes, a user views reports via a reporting interface provided by the reporting system. As used herein, a reporting interface may be a user interface including multiple control options that can be customized based on the user's requirement to display one or more reports. FIG. 1 depicts one such reporting interface 100. The reporting interface 100 includes an interactive report list section 102 and a report display section 104. As can be seen, the interactive report list section 102 lists the reports that are available to a user. In this example, numerous reports are available (with further reports to be displayed via a scroll interface 106). In order to view a report and determine whether the reports provides information that is relevant to the user, the user selects a report (e.g., in the interactive report list section 102). This causes the selected report to be displayed in the report display section 104 where the user can review the report to determine whether it is of relevance or not.

The reporting interface 100 may also enable a user to customize the display. For example, users may be able to add reports to the interactive report list section 102 that the user is interested in, remove reports the user is no longer interested in, and/or filter the reports in the interactive report list section 102 based on one or more parameters. However, even with these customizations, the reporting interface 100 may not aid in reducing cognitive burden on the user. For example, in case one of the reports includes trends or information that may require user's prompt attention/action, the user still has to review the complete report to identify the trends and deviations (if any). Further, there is no way for the user to know which reports require the user's prompt attention/action from the list of displayed reports and the user has to select and display each report in the report display section 104 frequently to determine which report if any requires attention.

To illustrate this, consider again the scenario of an organization that, as part of its operations, runs a service desk. For such an organization, the number of tickets resolved may be a useful metric. Accordingly, the known reporting system may be configured to automatically generate a "tickets resolved" report on a periodic basis (e.g. weekly) that provides information on this metric—e.g. the number of tickets resolved in the last week. For a person directly involved in managing the service desk, the "tickets resolved" report may be a high priority report. For the CEO of such an organization, however, the "tickets resolved" report may only be of interest if there is a significant deviation from normal. For example, if the number of tickets resolved per week consistently tracks at x, then a particular instance of the "tickets resolved" report that indicates x plus or minus, for example 5% tickets were resolved over the preceding week, is unlikely to be of interest to the CEO. In contrast, a particular instance of the "tickets resolved" report that indicates x plus or minus (say) 25% were resolved over the preceding week may be of significant interest to the CEO.

In known reporting systems, however, in order to tell if there was a deviation, the CEO would need to open the "tickets resolved" report each week to determine if the metric reported on was actually of interest/relevance or not. If the CEO only had to review a single report this may not be a burden, however the CEO may well have 50 (or even more) reports available to them. In this case, opening every report to try and determine whether a report is of interest or not presents a cognitive burden (and, potentially, significant expenditure of time) for the CEO. Further, opening and viewing a report consumes computational and communications resources that could potentially be avoided. Additionally or alternatively, computing resources may be conserved in circumstances where a report is not delivered to or otherwise made accessible to a particular user. Additionally or alternatively still, such user interfaces that do not provide access to particular reports for a particular user are decluttered to enable use of limited user interface space for other data elements.

To address one or more of the issues describe above, the present disclosure provides an improved reporting system and method that can reduce the cognitive burden on users, the time taken to perform tasks, reduce visual user interface clutter, and/or the use of computational and communications resources. In particular, the reporting systems and methods disclosed herein automatically identify high priority reports based on metric deviation and/or defined priority calculation parameters (e.g. user or system defined metric thresholds). Reports that have been identified as high priority reports can then be emphasized or surfaced (or otherwise drawn to a user interface to get a user's attention) in various ways. In certain embodiments, emphasis of reports is achieved by specifically listing those reports in a graphical user interface (e.g. a reporting interface) and de-emphasis of reports is achieved by, at least initially, hiding those reports in the graphical user interface. In other examples, emphasis can be achieved by automatically ordering the reports in a user interface in order of priority.

In some examples, to determine high priority reports, the reporting system is configured to calculate priority values for one or more reports using one or more parameters and the underlying metric data associated with the reports, arrange the reports in an order (e.g., ascending or descending based on their associated priority value), and select at least a subset of the ordered reports as high priority reports. Non-limiting examples of the one or more priority calculation parameters includes a report importance associated with a report and one or more deviation threshold values.

In some examples, a priority threshold may be specified and reports having a priority value higher than the priority threshold may be selected as high priority reports. The priority threshold for a given set of reports may be calculated or it may be a predefined or default value. In some embodiments, the priority threshold value may be provided by a user.

In some embodiments, the reporting system may also generate additional information for the high priority reports and cause display of this information in the reporting interface. The additional information may summarize the reason why the report was considered a high-priority report. For example, the additional information may indicate that a metric associated with a given report has exceeded an expected value by a threshold amount. Further, the reporting system may be configured to generate and communicate alerts to one or more user accounts/device for example, via email, audio message, video message, text message, or any other appropriate communication channel.

The functionality described herein may be provided as native functionality of a reporting system. Alternatively, the functionality described herein may be provided as an add-on or plug-in to an existing reporting system, or as a standalone application that runs in conjunction (and communicates) with an existing reporting system. As noted, one example of a reporting system may be a Jira product provided by Atlassian, but the techniques and features described herein may be used (or be adapted to be used) with various other systems that operate to generate reports.

Example System

Figure 2:
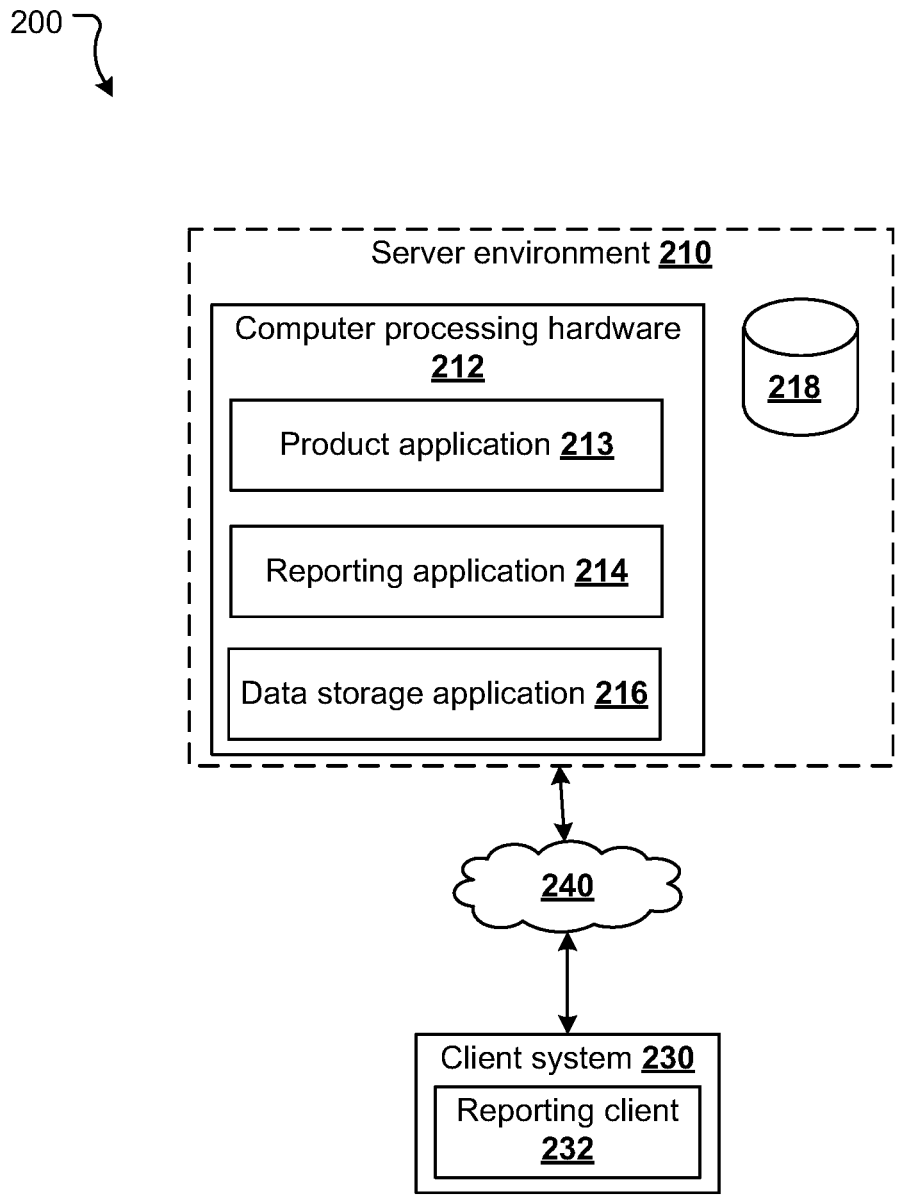
FIG. 2 is a block diagram depicting an example networked environment in which various features of the present disclosure may be implemented.

FIG. 2 depicts one example of a networked environment 200 in which the operations and techniques described herein can be performed. The networked environment 200 includes a server environment 210 and a client system 230 which communicate via one or more communications networks 240 (e.g. the Internet).

Generally speaking, the server environment 210 includes computer processing hardware 212 (discussed below) on which applications that provide server-side functionality to client applications such as reporting client 232 (described below) execute. In the present example, the server environment 210 includes a reporting application 214 and a data storage application 216.

Generally speaking, the reporting application 214 execute to provide a reporting client endpoint that is accessible over the communications network 240. To do so, the reporting application 214 may include one or more application programs, libraries, APIs or other software elements that implement the features and functions that are described herein. For example, where reporting application 214 serves web browser reporting clients the reporting application 214 is a web server which receives and responds to, for example, HTTP application protocol requests. Where reporting application 214 serves native reporting clients, reporting application 214 is an application server configured to receive, process, and respond to API calls from those reporting clients.

The server environment 210 may include both web server and application reporting applications allowing it to interact with both web and native reporting clients.

The reporting application 214 can be implemented as a monolithic application. Alternatively, the reporting application 214 can be implemented as a collection of independent and autonomous application services (e.g. microservices). In this case, the constituent application services communicate amongst themselves, with other reporting applications 214, and/or with reporting clients 232, via defined interfaces such as web APIs.

In addition to the reporting application 214, the server environment 210 may include a product application 213 that is configured to provide execute a software product. Examples of software products hosted by the product application 213 may include incident management systems (e.g., OpsGenie), software code management system (e.g., Bitbucket), issue tracking applications (e.g., JIRA), web-based, Kanban-style, list-making applications (e.g., Trello) or web-based collaboration wiki application (e.g., Confluence). Confluence, Trello, Jira, OpsGenie, and BitBucket are all offered by Atlassian, Inc.

In addition to the specific functionality described herein, the reporting application 214 (alone or in conjunction with the product application 213) may provide additional functions that are typically provided by server systems—for example user account creation and management, user authentication, and/or other server side functions.

The data storage application 216 executes to receive and process requests to persistently store and retrieve data that is relevant to the operations performed/services provided by the server environment 210. Such requests may be received from the reporting application 214, product application 213, and/or (in some instances) directly from reporting clients such as 232.

The data storage application 216 may, for example, be a relational database management application or an alternative application for storing and retrieving data from a data store 218. The data storage application 216 stores data to and retrieves data from one or more non transient (or persistent) data stores 218—e.g. non-transitory computer readable media or storage devices such as hard disks, solid state drives, tape drives, or alternative computer readable storage devices.

In the server environment 210, the reporting application 214 and product application 213 persistently stores data to the data store 218 via the data storage application 216. In alternative implementations, however, the reporting application 214 may be configured to directly interact with the data stores 218 to store and retrieve data (in which case a separate data storage application may not be needed). Furthermore, while a single data storage application 216 is described, the server environment 210 may include multiple data storage applications. In this case, each data storage application may interface with one or more shared data stores 218 and/or one or more dedicated data stores 218, and each data storage application 216 may receive/respond to requests from various server-side and/or client-side applications (including, for example reporting application 214).

The data store 218 is used to store data related to the operation of the product application 213 and the reporting application 214. For example, in case the server environment 210 is an issue tracking system, the data store 218 may store data relevant to the operations performed/services provided by the server environment 210 and may include, product data and reporting data. Product data generally includes: data defining the operation of the hosted application (for example, user accounts, user permissions, and the like); and application data (i.e., the content hosted/maintained by the application, which can be, for example, issue data (in an ITS), project data, page and space data (in a collaboration/wiki system), or any other type of product data. Reporting data may include, for example, data associated with metrics (e.g., metric identifier, metric definition, calculation formula (if any), etc.), data associated with reports (e.g., report identifier, importance value, report creator, report metric value at a given time, etc.), data required to compute report priorities (e.g., report regular values, report deviation thresholds, report priority thresholds, etc.), report usage data (e.g., number of time a report has been viewed by a given user in a time window), etc.

The data store 218 may be accessed by a database server which may be hosted by the reporting application 214 or any other application on the server environment 210 or on cloud network. In some embodiments, the data store 218 may be provided by a data server that is more typically hosted on a separate physical computer in communication (directly or indirectly via one or more networks 240) with the product application 213 and/or the reporting application 214. While a single data store 218 is described, multiple separate data stores could be provided.

While single server device architecture and single server environment has been described herein, it will be appreciated that the server environment 210, product application 213, reporting application 214, and the data storage application 216 can be implemented using alternative architectures. For example, in certain embodiments, the server environment 210 is a scalable system including multiple distributed server nodes connected to one or more shared data stores (e.g. shared file servers). Depending on demand from users (and/or other performance requirements), server nodes of the server environment 210 can be provisioned/de-provisioned on demand to increase/decrease the number of servers offered by the server environment 210. Each reporting application may run on a separate computer system and include one or more application programs, libraries, APIs or other software that implement server-side functionality. Similarly, the data storage application 216 may run on the same computer system as the product and/or reporting applications, or may run on their own dedicated system(s) (accessible to the product and reporting applications either directly or via a communications network).

As noted, the product application 213, reporting application 214 and data storage application 216 run on (or are executed by) computer processing hardware 212. The computer processing hardware 212 includes one or more computer processing systems. The precise number and nature of those systems will depend on the architecture of the server environment 210.

For example, in one implementation a single product application runs on its own computer processing system, reporting application 214 runs on its own computer processing system and a single data storage application 216 runs on a separate computer processing system. In another implementation, a single product application 213, a single reporting application 214 and a single data storage application 216 run on a common computer processing system. In yet another implementation, server environment 210 may include multiple product and/or reporting applications running in parallel (on one or multiple computer processing systems).

In a further implementation, server environment 210 is a scalable environment in which application instances (and the computer processing hardware 212—i.e. the specific computer processing systems required to run those instances) are commissioned and decommissioned according to demand—e.g. in a public or private cloud-type system. In this case, server environment 210 may simultaneously run multiple reporting applications 214 and/or multiple data storage applications 216 (on one or multiple computer processing systems) as required by client demand. Where server environment 210 is a scalable system it will include additional applications to those illustrated and described. As one example, the server environment 210 may include a load balancing application which operates to determine demand, direct client traffic to the appropriate product and/or reporting application instance 213 and/or 214 (where multiple product and/or reporting applications 213 and/or 214 have been commissioned), trigger the commissioning of additional server environment applications (and/or computer processing systems to run those applications) if required to meet the current demand, and/or trigger the decommissioning of server environment applications (and computer processing systems) if they are not functioning correctly and/or are not required for current demand.

As a further example, where an application (e.g. reporting application 214) is implemented as a collection of application services, each application service may run on its own computer processing system or multiple application services may run on a common computer processing system.

Communication between the applications (and/or application services) and computer processing systems of the server environment 210 may be by any appropriate means, for example direct communication or networked communication over one or more local area networks, wide area networks, and/or public networks (with a secure logical overlay, such as a VPN, if required).

While environment 200 has been provided as an example, alternative system environments/architectures are possible. For example, the reporting application 214 may not be a standalone application and instead it may be a part of the product application 213.

The present disclosure describes various operations that are performed by applications of the server environment 210. Generally speaking, however, operations described as being performed by a particular application (e.g. reporting application 214) could be performed by one or more alternative applications, and/or operations described as being performed by multiple separate applications could in some instances be performed by a single application.

Returning to FIG. 2, the client system 230 hosts a reporting client 232 which, when executed by the client system 230, configures the client system 230 to provide client-side functionality with server environment 210 (or, more specifically, the reporting application 214 and/or other application provided by the server environment 210).

A user of the client system 230 is associated with at least one user account. The client system 230 is configured to communicate electronic content to the server environment 210. This includes any type of user account interaction with the server environment 210, including, for example, interacting with (i.e., sending data to and receiving data from) the server environment 210, and viewing or interacting with reporting interface displayed on a display device of the client system 230.

The reporting client 232 may be a general web browser application which accesses the reporting application 214 via an appropriate uniform resource locator (URL) and communicates with the reporting application 214 via general world-wide-web protocols (e.g. http, https, and ftp). Alternatively, the reporting client 232 may be a native application programmed to communicate with reporting application 214 using defined application programming interface (API) calls.

A given client system such as 230 may have more than one reporting client 232 installed and executing thereon. For example, a client system 230 may have a (or multiple) general web browser application(s) and a native reporting client.

While networked environment 200 depicts a single client system 230, the server environment 210 will typically serve many client systems 230.

The preceding paragraphs describe the reporting application 214 and the reporting client 232 in general terms. In accordance with aspects of the present disclosure, the reporting application 214 and reporting client 232 are configured to execute the reporting system as described previously. In particular, the reporting client 232 is configured to receive report data from the reporting application 214 and display this report data in a reporting interface on the client system 230. Further, the reporting client 232 is configured to receive user inputs, generate requests based on these user inputs, communicate these to the reporting application 214, and receive responses from the reporting application 214 to display on the client system 230.

Figure 3:
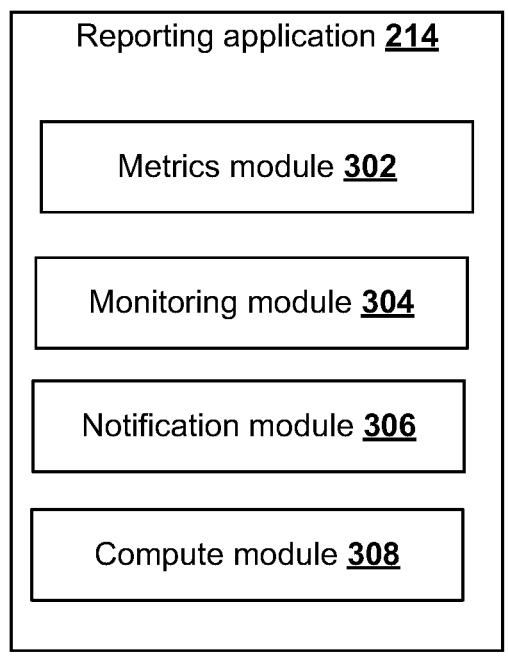
FIG. 3 is a block diagram of an exemplary reporting application according to aspects of the present disclosure.

The reporting application 214 is configured to compute report priorities. To that end, the reporting application 214 includes a number of modules. FIG. 3 is a block diagram illustrating the reporting application 214 according to some aspects of the present disclosure. As shown, the reporting application 214 includes a metric module 302, a monitoring module 304, a notification module 306, and a compute module 308.

The metric module 302 is configured to maintain metric data, calculate metrics based on raw underlying data (e.g., product data or event records stored by the product application 213) and store the computed metric data. In one example, the metric module 302 may maintain a database of metric data including, e.g., metric names, associated computation formula (if any), and the identifiers of the raw data fields based on which the metrics can be computed. At predetermined intervals, e.g., every second, every 5 seconds, every minute, every hour, etc., the metric module 302 may be configured to retrieve values of the raw data fields and metric computation formulae to determine the current actual metric values of the metrics maintained by the module. In some examples, different metric may have different computation frequencies and the metric module 302 may be configured to schedule the metric computation based on the computation frequency associated with the corresponding metrics. Once the actual metric values are computed, they may be stored in a metric data store.

The monitoring module 304 is configured to monitor (continuously or at regular intervals) values of the metrics managed by the metric module 302 and, in some examples, determine whether a breach event has occurred. In particular, the monitoring module 304 is configured to determine if there is a deviation in the value of a monitored metrics from an expected or average value for that metric. The deviation may be determined in various ways. In one example, users may provide the expected value or range of values for a given metric. If the monitoring module 304 determines that the actual value of a metric falls outside this expected value or range of values the monitoring module 304 may be configured to determine that a breach event has occurred. Alternatively, the monitoring module 304 may maintain a rolling average value for a given metric over a period of time. For example, it may determine the average metric value for a given metric based on the instantaneous values of that metric over a period of time (e.g., 10 days). The current actual metric value of a monitored metric may then be compared to this rolling average value to determine whether the value has deviated from this rolling average. For instance, if the current metric value is determined to fall outside the current average value by more than a breach threshold (e.g., 5%), the monitoring module 304 may be configured to determine that a breach event has occurred. It will be appreciated that the breach threshold values for determining breach events may be configurable. Tight thresholds may be applied if it is desirable to catch even minor fluctuations in metric values whereas looser thresholds may be applied if it is desirable to reduce computational loads and update report priorities when major fluctuations are observed.

The compute module 308 is configured to rank reports visible to a user based on a priority order and in some examples to further identify high priority reports from the ordered reports. As described previously, to identify high priority reports, the compute module 308 is configured to calculate priority values of the reports visible to a user, order the reports based on the priority values and then select a subset of the ordered reports as high priority reports. This selection may be based on a priority threshold value.

A report priority can be calculated in various ways. In example embodiments, priority of a report is calculated based on a report deviation over a time period. This is described further below. Additionally, the priority calculation for a given report may be based on one or more priority calculation parameters defined for that report. In the present embodiments, the priority calculation parameters include a deviation threshold for metrics present in the reports, a report importance value (d), regular value of metrics, and/or any other parameters. In alternative embodiments, priority calculation may be based on additional, fewer, and/or alternative parameters.

The deviation threshold values may be predefined, user defined, or automatically calculated by the compute module 308. Further, the deviation thresholds are typically different for different reports/underlying metrics. In certain embodiments, the deviation threshold may also be different for different users/roles. For example, for user U1, the deviation threshold for a 'tickets resolved' metric in a given report may be 100, but for U2, the deviation threshold for the 'tickets resolved' metric in the same report may be 150.

Similarly, the report importance may be predefined, user defined, or automatically calculated by the compute module 308 and may be different for different users. For example, for user U1, the importance value for a given report may be 5, but for user U2 the importance value for the same report may be 1. Further, the report importance value for a given report (and given user) may take into account one or both of a predefined report importance value and an inferred report importance value. A predefined importance value may be a default importance value or a user defined importance value. An inferred report importance value may be calculated by the compute module 308 based, for example, on usage-patterns or direct feedback provided by users. For instance, the compute module 308 may monitor user interactions with the available reports and, on detecting certain usage patterns, infer that a particular report is important and adjust an inferred report importance value accordingly. As an example, if the compute module 308 detects that user U1 interacts with report R1 several times, the reporting application 214 may be configured to infer that report R1 is important to user U1 and increase the importance value of a report from a default value accordingly. Similarly, if the compute module 308 detects that user U1's interactions with the report R1 decrease significantly over a particular period, it may decrease the importance value of the report for the user accordingly. In other cases, the compute module 308 from time to time may request user feedback on the reports displayed to the user. If the user provides positive feedback, the compute module 308 may maintain the inferred importance of the reports. However, if the user provides negative feedback, the compute module 308 may adjust the inferred importance of the displayed reports to reduce their importance.

Because these priority calculation parameters may be different for different users, the compute module 308 is configured to calculate the priority of reports on a user-by-user (or, alternatively, a user role-by-user role basis) in such embodiments and the priority of a given report may be different for different users/roles. For example, there may be three different users (e.g. U1, U2, and U3) that all have access to a report R1. If different deviation threshold value and/or different importance values are assigned to/by these users for report R1, periodic calculation of priority values for report R1 may involve calculating three priority values; a priority value for the report for user 1 (U1, R1); a priority value for the report for user 2 (U2, R1); and a priority value for the report for user 3 (U3, R1).

The priority calculation parameters may be stored by compute module 308 (e.g. in the data store 218) in any appropriate manner. By way of simple example, table structure such as the following may be used to store priority calculation parameters:

TABLE C priority calculation parameter database

| Report ID | User ID | Importance (d) | Deviation threshold ($M_{threshold}$) |
|---|---|---|---|
| 1 | 1 | 1 | 100 |
| 1 | 2 | 3 | 50-70 |
| 2 | 1 | 5 | 100 |
| ... | ... | ... | ... |

In some examples, the reporting application 214 may calculate priority values when requested. For example, priority values can be computed for an individual user when they first load a reporting user interface on their client system 230 or refresh the page. In other examples, priority values may be computed for multiple users based on a predefined schedule. For example, the compute module 308 may be configured to compute report priorities every hour, every 6 hours, daily, etc. In still other embodiments, computation of the priority values may be triggered by the occurrence of an event. To cater for event-based computation, the reporting application 214 may monitor conditions and determine when one or more events have occurred. Non-limiting examples of the one or more events include e.g., a data ingestion event (e.g., when a large amount of raw underlying data is imported into the data store associated with the product application 213), breach events, or a surge in usage of the reporting application 214.

Once report priority values are calculated, the compute module 308 may take various actions. In one example, if the priorities are computed based on a scheduled or event based job, the compute module 308 may store the computed priorities in a data store. For instance, the module may store the computed priorities, identifier of any identified high priority reports, additional information associated with the identified high-priority reports, an expiry time for the reports, along with an identifier of the user corresponding to the computed priorities. Alternatively, if the priorities are computed based on a request from an individual client system, the compute module 308 may cause a reporting interface to be presented on the client system 230 in which priorities of the reports are used to draw a list of high priority reports to the attention of the user and hide (or at least de-emphasize) low priority reports. In some embodiments, the compute module 308 may also determine whether any of the identified high priority reports have a priority value that exceeds a predetermined threshold value. If the priority value of a report exceeds such a threshold value, it may be considered a high impact report. In case a high impact report is identified during the priority computation process, the compute module 308 communicates information about the high impact report to the notification module 306 as described below.

The notification module 306 is configured to receive priority information for high impact reports from the compute module 308, generate one or more alerts based on the received information, and communicate the alerts to the corresponding users. For instance, the compute module 308 may identify a high impact report and generate additional information (such as insights) associated with the high impact report. It may communicate the report identifier along with the additional information and corresponding user identifier to the notification module 306. The notification module in turn may generate an alert including the additional information and e.g., a link to the identified high impact report. It may then communicate this alert to the corresponding user. Any known communication means such as email, SMS, chat message, etc. may be utilized for the communication.

Example Computer System

The techniques and operations described herein are performed by one or more computer processing systems.

By way of example, the client system 230 may be any computer processing system which is configured (or configurable) by hardware and/or software to offer client-side functionality. The client system 230 may be a desktop computer, laptop computers, tablet computing device, mobile/smart phone, or other appropriate computer processing system.

Similarly, the applications of the server environment 210 are also executed by one or more computer processing systems. Server environment computer processing systems will typically be server systems, though again may be any appropriate computer processing systems.

Figure 4:
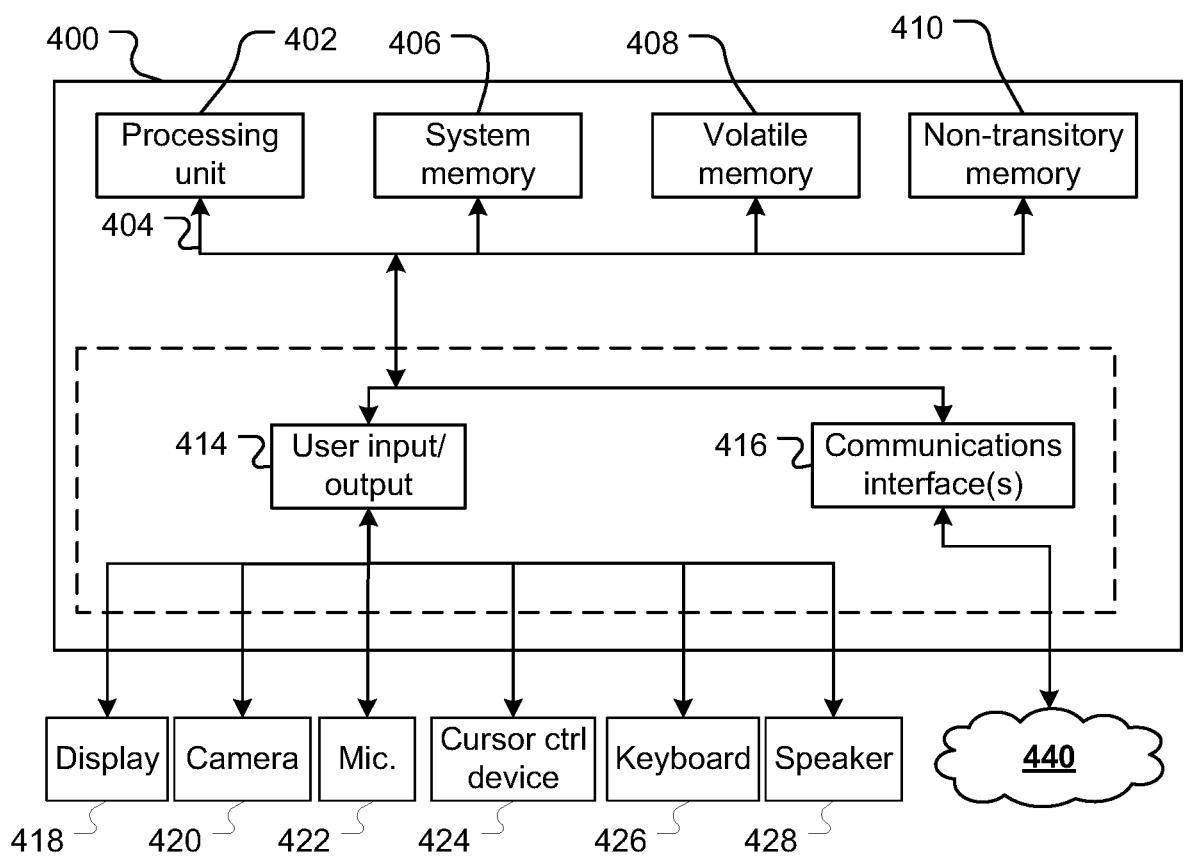
FIG. 4 is a block diagram of a computer processing system configurable to perform various features of the present disclosure.

FIG. 4 provides a block diagram of a computer processing system 400 ("system 400") configurable to implement embodiments and/or features described herein. It will be appreciated that FIG. 4 does not illustrate all functional or physical components of a computer processing system. For example, no power supply or power supply interface has been depicted, however the system 400 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

The computer processing system 400 includes at least one processing unit 402. The processing unit 402 may be a single computer processing device (e.g. a central processing unit, graphics processing unit, or other computational device), or may include a plurality of computer processing devices. In some instances, where a computer processing system 400 is described as performing an operation or function all processing required to perform that operation or function will be performed by processing unit 402. In other instances, processing required to perform that operation or function may also be performed by remote processing devices accessible to and useable by (either in a shared or dedicated manner) system 400.

Through a communications bus 404, the processing unit 402 is in data communication with a one or more machine readable storage (memory) devices which store computer readable instructions and/or data which are executed by the processing unit 402 to control operation of the processing system 400. In this example, the system 400 includes a system memory 406 (e.g. a BIOS), a volatile memory 408 (e.g. random access memory such as one or more DRAM modules), and a non-transitory computer readable medium or memory 410 (e.g. one or more hard disk or solid state drives).

The system 400 also includes one or more interfaces, indicated generally by 412, via which the system 400 interfaces with various devices and/or networks. Generally speaking, other devices may be integral with the system 400, or may be separate. Where a device is separate from the system 300, connection between the device and the system 400 may be via wired or wireless hardware and communication protocols, and may be a direct or an indirect (e.g. networked) connection.

Wired connection with other devices/networks may be by any appropriate standard or proprietary hardware and connectivity protocols. For example, the system 300 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, the system 400 may be configured for wireless connection with other devices/communications networks using one or more of: BlueTooth; WiFi; near field communications (NFC); Global System for Mobile Communications (GSM), and/or other wireless connections.

Generally speaking, and depending on the particular system in question, devices to which the system 400 connects—whether by wired or wireless means—include one or more input devices to allow data to be input into/received by the system 300 and one or more output device to allow data to be output by the system 400. Example devices are described below, however it will be appreciated that not all computer processing systems will include all mentioned devices, and that additional and alternative devices to those mentioned may well be used.

For example, the system 400 may include or connect to one or more input devices by which information/data is input into (received by) the system 400. Such input devices may include keyboard, mouse, trackpad, microphone, accelerometer, proximity sensor, GPS, and/or other input devices. The system 400 may also include or connect to one or more output devices controlled by the system 400 to output information. Such output devices may include devices such as a display (e.g. a LCD, LED, touch screen, or other display device), speaker, vibration module, LEDs/other lights, and/or other output devices. The system 400 may also include or connect to devices which may act as both input and output devices, for example memory devices (hard drives, solid state drives, disk drives, and/or other memory devices) which the system 400 can read data from and/or write data to, and touch screen displays which can both display (output) data and receive touch signals (input).

By way of example, where the system 400 is a client system such as 230 it may include a display 418 (which may be a touch screen display), a camera 420, a microphone 422 (which may be integrated with the camera), a cursor control device 424 (e.g. a mouse, trackpad, or other cursor control device), a keyboard 426, and a speaker 428.

The system 400 also includes one or more communications interfaces 416 for communication with a network, such as network 240 of the environment 200 (and/or a local network within the server environment 210). Via the communications interface(s) 416, the system 400 can communicate data to and receive data from networked systems and/or devices.

The system 400 may be any suitable computer processing system, for example, a server computer system, a desktop computer, a laptop computer, a netbook computer, a tablet computing device, a mobile/smart phone, a personal digital assistant, or an alternative computer processing system.

The system 400 stores or has access to computer applications (also referred to as software or programs)—i.e. computer readable instructions and data which, when executed by the processing unit 402, configure the system 400 to receive, process, and output data. Instructions and data can be stored on non-transitory computer readable medium such as 410 accessible to system 400. Instructions and data may be transmitted to/received by system 400 via a data signal in a transmission channel enabled (for example) by a wired or wireless network connection over an interface such as communications interface 416.

Typically, one application accessible to the system 400 will be an operating system application. In addition, the system 400 will store or have access to applications which, when executed by the processing unit 402, configure the system 400 to perform various computer-implemented processing operations described herein. For example, and referring to the networked environment of FIG. 2 above, the server environment 210 includes one or more systems which run a reporting application 214, a data storage application 216. Similarly, the client system 230 runs a reporting client 232.

In some cases part or all of a given computer-implemented method will be performed by the system 400 itself, while in other cases processing may be performed by other devices in data communication with the system 400.

Example Methods

The reporting application 214 as previously described executes three main functions—it monitors metric data and identifies breach events (e.g., when actual metric values are outside excepted metric threshold values or threshold ranges), it computes priorities, and it generates and communicates alerts to users (if required).

Figure 5:
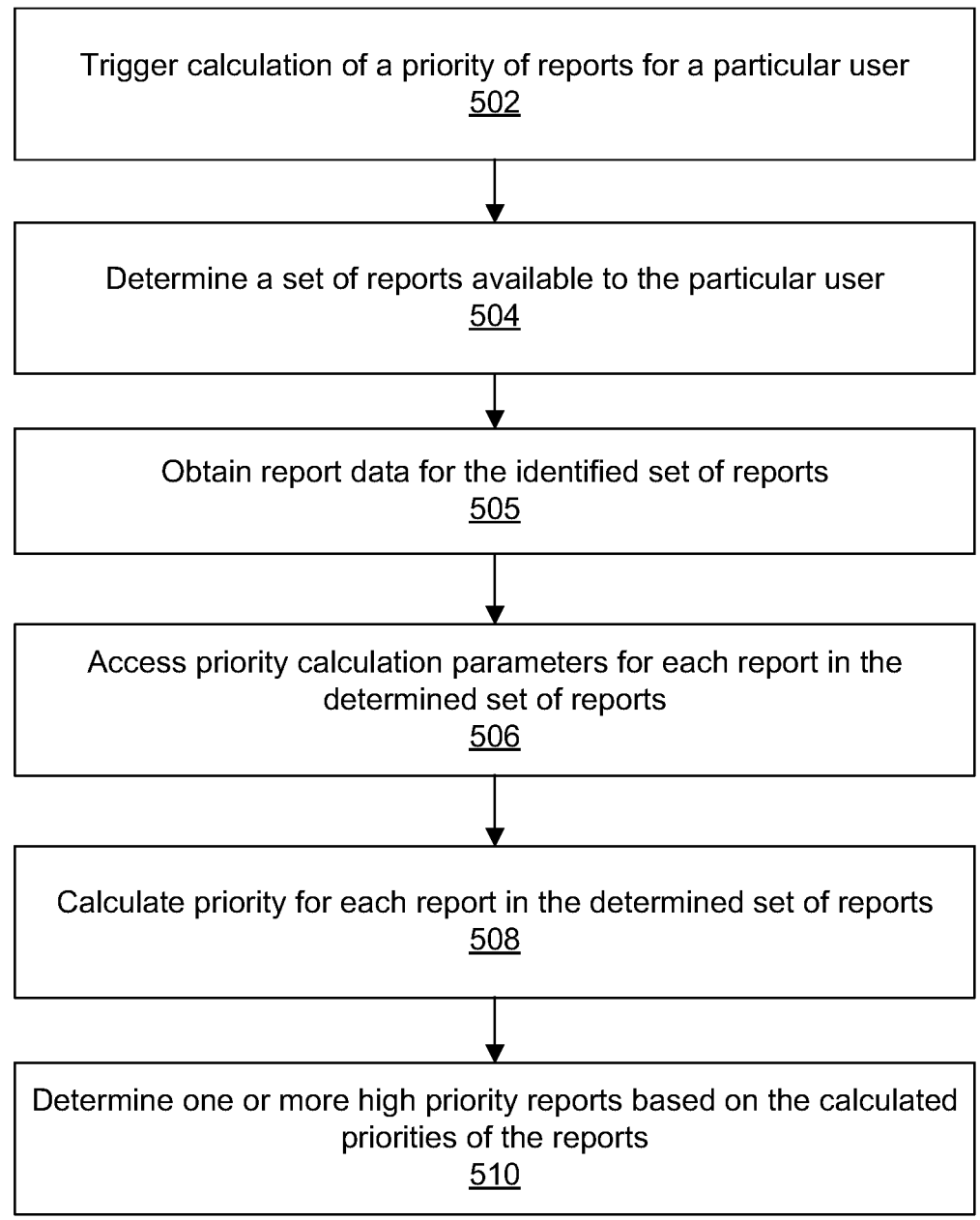
FIG. 5 is a flowchart depicting an example method for presenting one or more reports according to an aspect of the present disclosure.

FIG. 5, illustrates an example method 500 for computing report priorities. The operations of method 500 will be described as being performed by the reporting application 214 running on the server environment 210, and the reporting client 232 running on the client system 230, respectively. In alternative embodiments the processing described may be performed by one or more alternative systems (operating in conjunction with the reporting application 214, the reporting client 232 or independently) and/or alternative applications running on those systems. A user can access the reporting application 214 via the client system 230. The reporting application 214 enables the user to access, generate, define, customize, update, and/or view one or more reports via the reporting interface.

At 502, calculation of report priorities for a particular user (or a particular user group or team) is triggered. The calculation of report priorities may be triggered in various ways. For example, the reporting application 214 may be configured to automatically calculate report priorities for a given user periodically (e.g. daily, weekly, or an alternative period). Alternatively, or in addition, priorities may be computed when a user accesses the reporting interface or when explicitly requested by a given user (e.g. via an appropriate user interface control provided by reporting client 232). Further alternatively, the reporting application 214 may be configured to monitor certain events and trigger to initiate report priority calculation for a given user on detecting the occurrence of such an event/condition (e.g., breach events, data ingestion events, or usage surge).

At 504, the reporting application 214, and in particular the compute module 308, determines the set of reports that are available to the particular user. The compute module 308 may determine this in various ways, for example by looking up a database that provides information on what reports are available to a user (e.g. based on a role of the user, permissions of the user, data indicating reports the user has subscribed to, and/or any other relevant data).

At step 505, the compute module 308 retrieves report data for the identified set of reports. In one example, the identified reports may have been generated within a threshold period of time (e.g., within the last 6 hours, last hour, 10 minutes ago, etc.). In such cases, the compute module 308 may retrieve the report data from the data store 218 (e.g., by performing a lookup in a database similar to that shown in Table B). In some examples, the report data may include the report identifier, metric identifier(s), and metric value(s) associated with each report. In other examples, one or more of the identified reports may not have been generated within the threshold period of time. In such cases, the compute module 308 may retrieve the values of the one or more metrics associated with each of the one or more reports (e.g., by performing a lookup in the data store maintained by the metric module 302). It may also populate the metric values in the report data for the corresponding reports stored in the data store 218 (e.g., in table B).

At 506, the compute module 308 accesses one or more priority calculation parameters for the given user and for each report in the set of reports determined at 504. The one or more priority calculation parameters in the present embodiments, include (for each report) a threshold deviation (value or range) of the metric(s) in each report ($M_{threshold}$) and report importance (d). In some embodiments, the one or more priority calculation parameters also includes priority thresholds. In one embodiment, if a value of $M_{regular}$ (i.e., expected value of a metric) is not received from a user, the reporting application 214 and in particular the monitoring module 304 may initialise the $M_{regular}$ to Root Mean Square for the duration T ($RMS_T$). In other examples, the $M_{regular}$ may be determined based on a rolling average of the metric value for a duration of time T.

In an example, for an alert metric, 60 alerts ($M_{regular}$) may be considered the expected metric value and if number of alerts is beyond 120 or less than 10 may be considered a deviation from the usual alert metric value. So in this example, $M_{regular}$ is 60 and $M_{threshold}$ can be 120 alerts (upper end value) and/or 10 alerts (lower end value). The reporting application 214 may allow the $M_{threshold}$ value to be set for a lower end value, an upper end value for a metric, or both.

In an example, compute module 308 retrieves the priority calculation parameters from the data store 218 (and in particular from the priority calculation parameters database, see table C).

At 508, the compute module 308 calculates a priority value for each report in the set of reports determined at 504. A priority value for a given report may be calculated in various ways. In the present embodiment, and by way of example, the compute module 308 is configured to calculate the priority (p) value for a given report (i) (and the particular user) with reference to a defined duration (T), the report importance value (d) (for the particular report and particular user) and a report deviation ($\delta$). Specifically:

$$p_i = \Sigma_{t \in T} d_i * \delta_{it} \quad (1)$$

In other words, the priority for a given report i ($p_i$) is calculated as the sum of the multiplication of the report's importance value ($d_i$) and the deviation ($\delta$) observed for individual time periods (t) over a total duration (T). The total duration T may be assigned a default value (e.g. 1 day or an alternative value). The compute module 308 may also provide a mechanism that allows the total duration T to be set to longer or shorter durations.

The deviation ($\delta$) for a given report (i) for a particular time interval (t) may also be calculated in various ways. For example, the deviation ($\delta$) may be calculated using machine learning or statistical models. By way of one specific example, in the present embodiments deviation ($\delta$) is calculated using a threshold based delta normalized by outlier-removed-mean (using, for example, a technique like Minimum Covariance). For example the deviation ($\delta$) for a particular report (i) for a particular time interval (t) may be calculated as:

$$\delta_{it} = \frac{x - M_{threshold}}{\mu_x} \quad (2)$$

where x is the value of the relevant metric of report i for time interval t, $M_{threshold}$ is the deviation threshold for report i (for the particular user) $\mu_x$ is the expected or mean value of x (e.g. over all values of x over the total duration T). In some examples, instead of using the mean value of x over duration T, the compute module 308 may be configured to retrieve the regular or expected value of a given metric and use this in equation (2) above. In one example, the compute module 308 may request a user that creates a report or a metric to provide the regular or expected value of the metric. In other examples, as previously described, the monitoring module 304 may continuously monitor the metric value and compute a metric expected or regular value as an average of the metric value over the entire time since the metric is created. In such cases, the metric regular or expected value may be stored in the data store 218 (e.g., either in table A or in table B) and the compute module 308 retrieves the value from the data store.

At 510, the compute module 308 determines one or more high priority reports based on the priorities calculated at 508. Determining high priority reports based on priority values may be performed in various ways. For example, in certain embodiments, compute module 308 may be configured to determine that a defined number of reports which have the highest priority values are high priority reports—e.g. the 5 (or an alternative defined number) reports with the highest priority values are high priority reports, and the remaining reports are low priority reports.

In an alternative embodiments, the compute module 308 determines high priority reports with reference to a priority threshold ($p_{threshold}$) value. Specifically, any report with a priority that is greater than or equal to the priority threshold is determined as a high priority report and any report with a priority that is less than the priority threshold is determined to be a low priority report.

In such embodiments the priority threshold may be calculated in various ways. For example, in certain embodiments, the compute module 308 is configured to calculate a priority threshold (if relevant, then priority threshold is also calculated at 510) as lying below the first sigma of the distribution:

$$p_{threshold} = \mu_p - \sigma_p \quad (3)$$

where $\mu_p$ the average priority of the priorities of the set of reports calculated at 506, and $\sigma_p$ is the standard deviation of the priorities of the set of reports calculated at 506.

In the embodiment described, the compute module 308 is configured to determine one or more high priority reports with reference to a priority threshold. In alternative embodiments, however, determination of the high priority reports could be performed (for example) by the reporting client 232. For example, the individual report priorities and priority threshold may be communicated to the reporting client 232 which may then use those values to determine high and low priority reports.

In still further alternative embodiments, determining the high priority reports may be omitted entirely. In this case, the calculated report priorities may be used to display reports in priority order (e.g. highest priority to lowest priority) without explicitly determining high and low priority reports.

Once the priorities are computed, the compute module 308 may be configured to store the computed data in a data store, ready to be communicated to a client system 230 (when requested). If the priorities were computed for a single user based on a request received from a client system 230, in addition to storing the computed priorities, the compute module 308 may communicate the computed priority data to the requesting client system 230 for display on the client system 230. FIG. 6A illustrates an example user interface that may be displayed on a client system 230 to display reports (e.g., high priority reports) to a user based on the received priority data.

Generally speaking, however, the data communicated to the reporting client 232 may include the actual report data (so actual reports can be displayed) and (in this example) data that allows the reporting client 232 to determine one or more high and low priority reports. The data allowing the reporting client 232 to determine the one or more high and low priority reports may be the report priorities calculated at 508 (and, if relevant, a priority threshold calculated at 510), a flag associated with each report (the flag indicating whether a report has been determined to be a high or low priority report), or alternative data usable by the reporting client to determine high and low priority reports.

In certain embodiments, the data communicated to the reporting client 232 may also include alert indicator data in respect of the reports (or, at least, the one or more high priority reports). For a given high priority report, this alert indicator data may provide additional information (e.g., insights) indicating the nature of the deviation that has been detected in the reports, and can be used by the reporting client 232 to display that additional information to a user. An example of this is described below with reference to the dialogue box 702 of FIG. 7.

In some embodiments, the reporting application 214 communicates data in respect of all available reports along with the calculated priorities of these reports to the client system 230 (and lets the client system 230 display high priority/collapse low priority reports based on the priority values).

Alternatively, the reporting application 214 may initially communicate only data in respect of the high priority reports and/or with associated priority values (so that the client system 230 can reorder the reports based on the priority values), then only communicate data for low priority reports if this is requested by the user.

Further, in some embodiments, if more than threshold number of high priority reports are determined, the reporting application 214 communicates only data associated with a threshold number of high priority reports (not all high priority reports) to the client system 230. Further, if more than a threshold number of high priority reports are determined, the client system may be configured so that only the threshold number of high priority reports are displayed. E.g. if the reporting application 214 determined 50 reports to be high priority reports and the threshold number of high priority reports is 10, then only data of first 10 high priority reports is communicated to the reporting client 232. The reporting client 232 then may be configured to only display the 10 reports with the highest priority values.

In alternative embodiments, the reporting application 214 communicates data of all the high priority reports to the client system 230. The reporting client 232 may be configured so that only the threshold number of high priority reports (i.e. 10) are displayed on the client system 230. For example, if 50 reports are determined to be high priority reports and their data is received from the reporting application 214 and the threshold is 10, then the reporting client 232 may be configured to only display the 10 reports with the highest priority values to the user.

On receiving data from the reporting application 214, the reporting client 232 displays one or more of the high priority reports based on the received data. The reporting client 232 may, for example, display high priority reports in an interactive list (or alternative interactive graphical representation) on a reporting interface on the display 418. The reporting client 232 may display reports in an order based on their priority (e.g. in order of descending or ascending priority). Non-limiting examples of an interactive graphical representation includes a pie chart, graph, banner, alert message, etc.

Further, the compute module 308 may determine whether any of the high priority reports identified at step 510 are also high impact reports. As described previously, this may be determined by comparing the priority values of the high priority reports with a threshold impact value (which may be a lower threshold value, a higher threshold value or a threshold range including a lower and higher bound). If the priority value exceeds/is lower than or is outside the threshold impact value, the corresponding report is considered to be a high impact report. If any such reports are identified, the compute module 308 communicates the high impact report data to the notification module 306. The notification module 306 in turn generates and sends an alert message including information about the identified high impact report to at least one user (for example, individual users or teams who view or are responsible for managing the report).

Example User Interface

Figure 6:
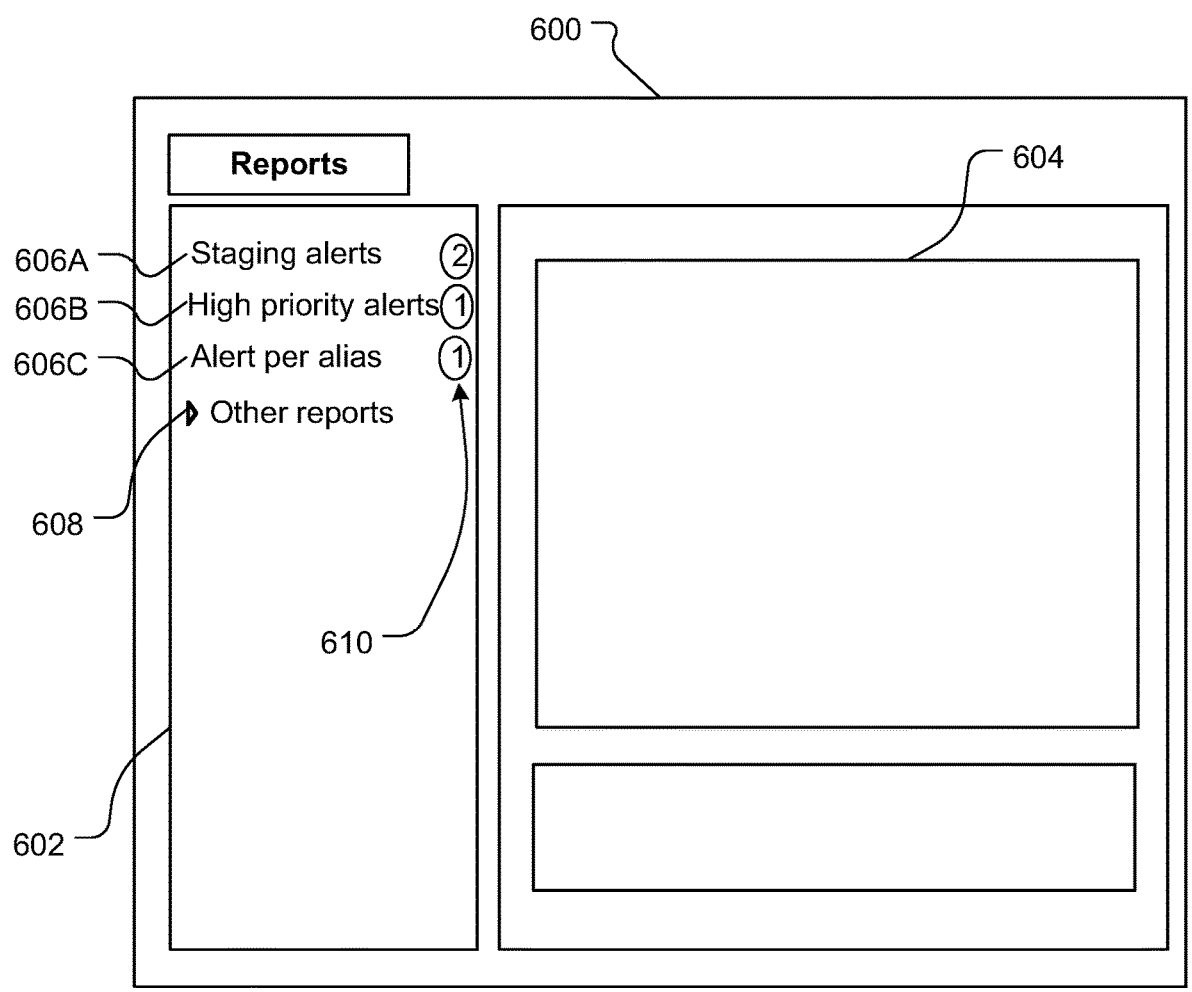
FIG. 6 illustrates an example reporting interface according to aspects of the present disclosure.

FIG. 6 illustrates an example user interface i.e., a reporting interface 600 for displaying information associated with a one or more reports to a user on a client system (for example, 230). As discussed with reference to FIGS. 2-5, the reporting application 214 can be a reporting system that is configured to cause or send data to the reporting client 232 to present the reporting interface 600 on a display 418 of the client system 230.

The reporting interface 600 includes a report list area 602 in which a list of reports available to the user can be displayed. Further, the reporting interface 600 includes a report display area 604 in which a selected report can be displayed.

As seen in this reporting interface, the three reports are displayed in the report list area 602 and the other reports are collapsed under the heading 'other reports'. It will be appreciated that the reports displayed in the report list area 602 may be the reports with the highest priority values or the reports that had priority values higher than the priority threshold. Reports that are collapsed under the 'other reports' heading may be reports with lower priority values or reports that had priority values below the priority threshold.

The reporting client 232 enables a user to interact with the reports displayed in the report list area 602, for example by selecting individual report names. For example, the reporting client 232 may be configured to detect a selection of a particular report, for example by detecting user interaction with that report's name 606A, 606B, and 606C (collectively "report names 606," for example 'Staging alerts' report as shown in FIG. 6). In response to detecting selection of a particular report, the reporting client 232 may retrieve the report data (e.g., from its internal cache) and display the selected report in report display area 604. If the reporting client 232 does not already have data in respect of the selected report, the reporting client 232 may generate and communicate a request for the report data to the reporting application 214 and display the report on receiving the data.

Furthermore, in the present examples, the reporting client 232 may also detect user selection of the collapsed reports, e.g. by interaction with an expand/collapse control (See Other reports option 608). In response, the reporting client 232 may display a list of low priority reports (optionally in an order based on their priority values). This then allows the user to view the low priority reports and, if desired, select one or more of those reports for viewing.

In this reporting interface 600, instead of displaying all reports available to the user (which could be tens or even hundreds of reports), the user is alerted to the fact that three reports are high priority (and should probably be viewed). The remaining reports that are available to the user (but which have been identified, based on their priority values, as low priority reports) are de-emphasized/hidden/collapsed under the 'other reports' item 608 in the report list.

Furthermore, in this example interactive alert indicators 610 are shown next to high priority report names 606. In this example, the numerals 1 and 2 are used to indicate different priority report levels. More generally, however, reporting client 232 may be configured to visually distinguish different priority alerts from one another in any appropriate manner. In one example, different priority alert indicators 610 may be displayed using different colors (for example, yellow for lower priority alerts, orange for mid-priority alerts, and red for high priority alerts.

Figure 7:
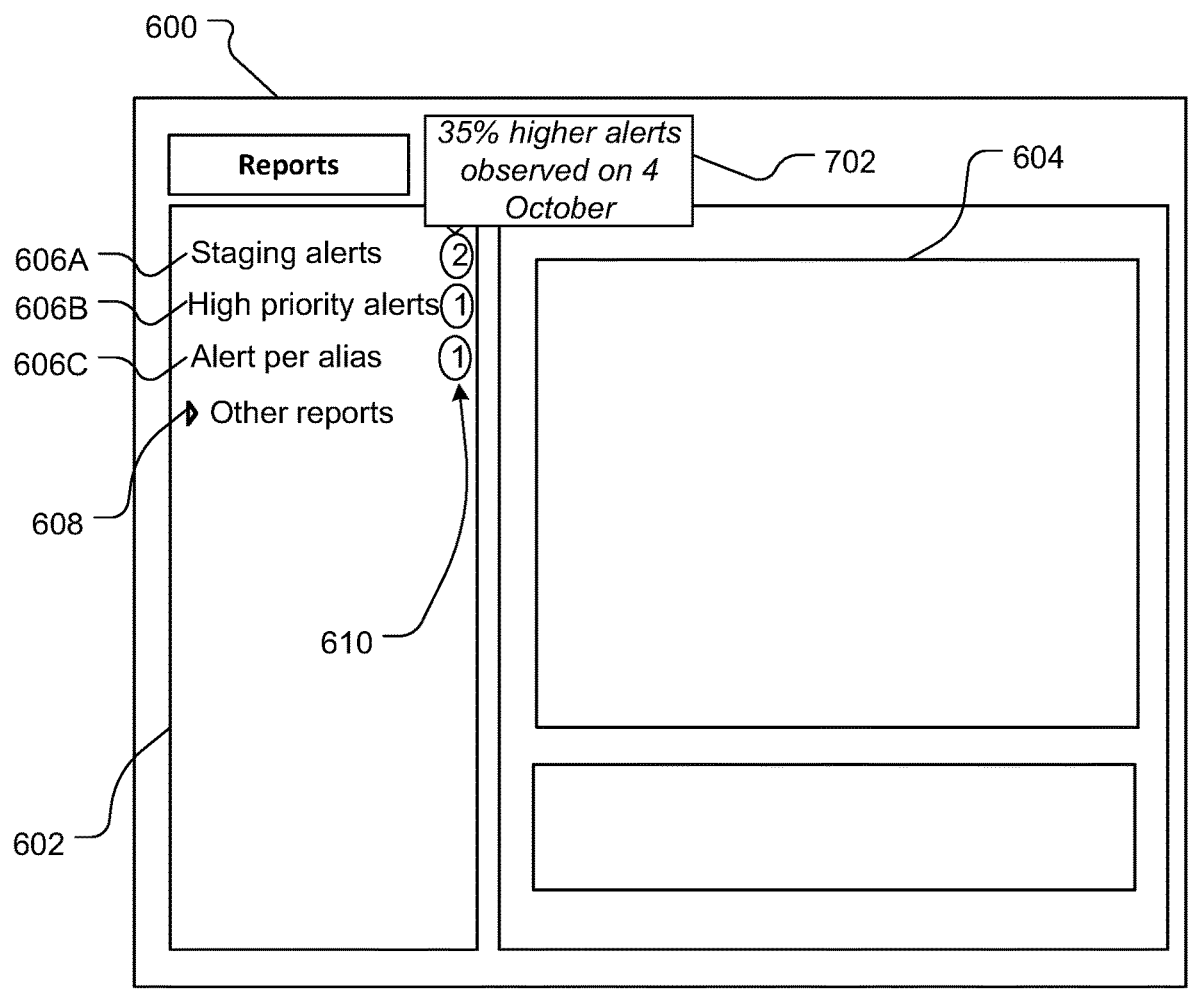
FIG. 7 illustrates another example reporting interface according to aspects of the present disclosure.

In this example, the reporting client 232 is configured to detect user interaction with an alert indicator of the alert indicators 610 and, in response, to display additional information in respect of the alert. Such interaction may, for example, be a user hovering over (or otherwise selecting) an alert indicator of the alert indicators 610. FIG. 7 depicts an example version of reporting interface 600 in which a user has interacted with the alert indicator of the alert indictors 610 associated with the "staging alerts" report 606A. In response, reporting client 232 has displayed a dialogue box 702, which provides additional information concerning the alert.

Notably, a user may interact with an alert that is associated with a report without having to actually select and view the entire report. In this particular example, therefore, a user can quickly and easily tell that there has been some kind of deviation detected with respect to the "staging alerts" report (indicated by the associated alert indicator of the alert indicators 610), and by interacting with that alert indicator find out that (in this particular example) "35% higher alerts" have been "observed on 4 October" (via the dialogue box 702). The user has been able to find out this information without having to actually view the staging alerts report. Additionally, computing resources are conserved by providing such information without requiring full retrieval, processing, and display of the data representing the full report itself.

It will be appreciated that the reporting interface 600 depicted in FIGS. 6 and 7 is provided by way of example only. Numerous alternatives for emphasizing (or more generally drawing a user's attention to) high priority reports and de-emphasizing (or entirely hiding) low priority reports (with the option of surfacing those reports if desired) are possible.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer-implemented method, comprising:
   determining, by a reporting application, a set of reports available to a user, each report including one or more metrics;
   obtaining, by the reporting application, metric data associated with each of the set of reports available to the user;
   accessing, by the reporting application, one or more priority calculation parameters for each report in the set of reports;
   calculating, by the reporting application, a priority value of each report of the set of reports based on the metric data and the priority calculation parameters for each report;
   determining, by the reporting application and based on the priority value of each report of the set of reports, one or more high priority reports of the set of reports and one or more non-high priority reports of the set of reports;
   automatically generating an order of the set of reports based at least in part on the priority value of each report, wherein the one or more high priority reports are ordered higher than the one or more non-high priority reports in the order; and
   causing rendering, to a client system by the reporting application, of a user interface that arranges the set of reports in accordance with the order of the set of reports to visually emphasize the one or more high priority reports.

2. The computer-implemented method of claim 1, wherein the priority calculation parameters include a report importance value associated with a corresponding report and one or more deviation threshold values.

3. The computer-implemented method of claim 2, wherein the report importance value includes an inferred report importance value and/or a predefined report importance value.

4. The computer-implemented method of claim 3, further comprising:
   monitoring the user's usage patterns of the high priority reports displayed on the client system;
   determining the inferred report importance value of the set of reports available to the user based on the usage patterns.

5. The computer-implemented method of claim 2, wherein calculating priority value for a given report comprises calculating a sum of a multiplication of the report importance value and a deviation observed for a plurality of individual time periods over a total time duration.

6. The computer-implemented method of claim 5, further comprising calculating the deviation observed for a given report for a particular time period using a threshold based delta normalized by outlier-removed-mean using actual metric values of the one or more metrics in the given report, the one or more deviation threshold values and expected metric values of the one or more metrics in the given report.

7. The computer-implemented method of claim 6, wherein the expected metric values of each of the one or more metrics in the given report is determined based on at least one of:
   a rolling average of the actual metric value over a predetermined time duration;

an average of the actual metric value over an entire time since the metric is created; or user input.

8. The computer-implemented method of claim 1, further comprising:
monitoring the metric values of a plurality of metrics;
comparing the metric values of each of the plurality of metrics to a corresponding threshold value or corresponding threshold range;
determining a breach event has occurred if a monitored metric value falls below or exceeds the corresponding threshold value or is outside the corresponding threshold range.

9. The computer-implemented method of claim 8, further comprising:
triggering the calculation of the priority values upon determining the breach event has occurred.

10. The computer-implemented method of claim 1, wherein the user interface renders the one or more high priority reports visible in a first section of the user interface and renders the one or more non-high priority reports in a collapsed section of the user interface separate from the first section of the user interface.

11. The computer-implemented method of claim 1, wherein obtaining the metric data associated with each of the set of reports available to the user comprises:
receiving a plurality of metric data sets, each metric data set associated with operation of a different user with at least one application; and
determining the metric data based at least in part on the plurality of metric data sets associated with the at least one application.

12. The computer-implemented method of claim 1, further comprising:
receiving, via the user interface, negative feedback associated with a particular report of the set of reports;
adjusting a particular priority value corresponding to the particular report to reduce an inferred importance associated with the particular report; and
causing rendering of updates to the user interface based at least in part on the particular priority value as adjusted, wherein the updates to the user interface visually de-emphasizes the particular report.

13. The computer-implemented method of claim 1, wherein accessing the one or more priority calculation parameters comprises:
determining the one or more priority calculation parameters based at least in part on the user or a user role corresponding to the user.

14. The computer-implemented method of claim 1, further comprising:
determining that the one or more high priority reports comprises a number of reports that exceeds a maximum report threshold, wherein causing rendering of the user interface comprises causing rendering of a highest priority subset of the one or more high priority reports, the highest priority subset of the one or more high priority reports comprising a listing of the one or more high priority reports up to the maximum report threshold, and wherein the remaining priority reports of the one or more high priority reports are not rendered to the user interface upon an initial rendering of the user interface.

15. The computer-implemented method of claim 1, further comprising:
causing rendering, within the user interface, of one or more interactive alert indicators, each interactive alert indicator corresponding to a particular report of the one or more high priority reports, wherein the interactive alert indicator indicates a deviation associated with the particular report corresponding to the interactive alert indicator.

16. A non-transitory computer readable medium storing instructions, which when executed by at least one processing unit to cause the at least one processing unit to:
determine a set of reports available to a user, each report including one or more metrics;
obtain metric data associated with each of the set of reports available to the user;
access one or more priority calculation parameters for each report in the determined set of reports;
calculate a priority value of each report of the set of reports based on the metric data and
the priority calculation parameters for each report;
determine, based at least in part on the priority value of each report of the set of reports, one or more high priority reports of the set of reports and one or more non-high priority reports of the set of reports;
automatically generate an order of the set of reports based at least in part on the priority value of each report, wherein the one or more high priority reports are ordered higher than the one or more non-high priority reports in the order; and
cause rendering, to a client system, of a user interface that arranges the set of reports in accordance with the order of the set of reports to visually emphasize the one or more high priority reports.

17. The non-transitory computer readable medium of claim 16, wherein the priority calculation parameters include a report importance value associated with a corresponding report and one or more deviation threshold values.

18. The non-transitory computer readable medium of claim 17, wherein the report importance value includes an inferred report importance value and/or a predefined report importance value.

19. A system comprising at least one processor and at least one non-transitory computer-readable storage medium having computer-coded instructions stored thereon, wherein the computer-coded instructions in execution with the at least one processor cause the system to:
determine, via a reporting application, a set of reports available to a user, each report including one or more metrics;
obtain, via the reporting application, metric data associated with each of the set of reports available to the user;
access, via the reporting application, one or more priority calculation parameters for each report in the set of reports;
calculate, via the reporting application, a priority value of each report of the set of reports based on the metric data and the priority calculation parameters for each report;
determine, via the reporting application and based at least in part on the priority value of each report of the set of reports, one or more high priority reports of the set of reports and one or more non-high priority reports of the set of reports;
automatically generate an order of the set of reports based at least in part on the priority value of each report, wherein the one or more high priority reports are ordered higher than the one or more non-high priority reports in the order; and
cause rendering, to a client system by the reporting application, of a user interface that arranges the set of reports in accordance with the order of the set of reports to visually emphasize the one or more high priority reports.

\* \* \* \* \*